UNITED STATES PATENT OFFICE.

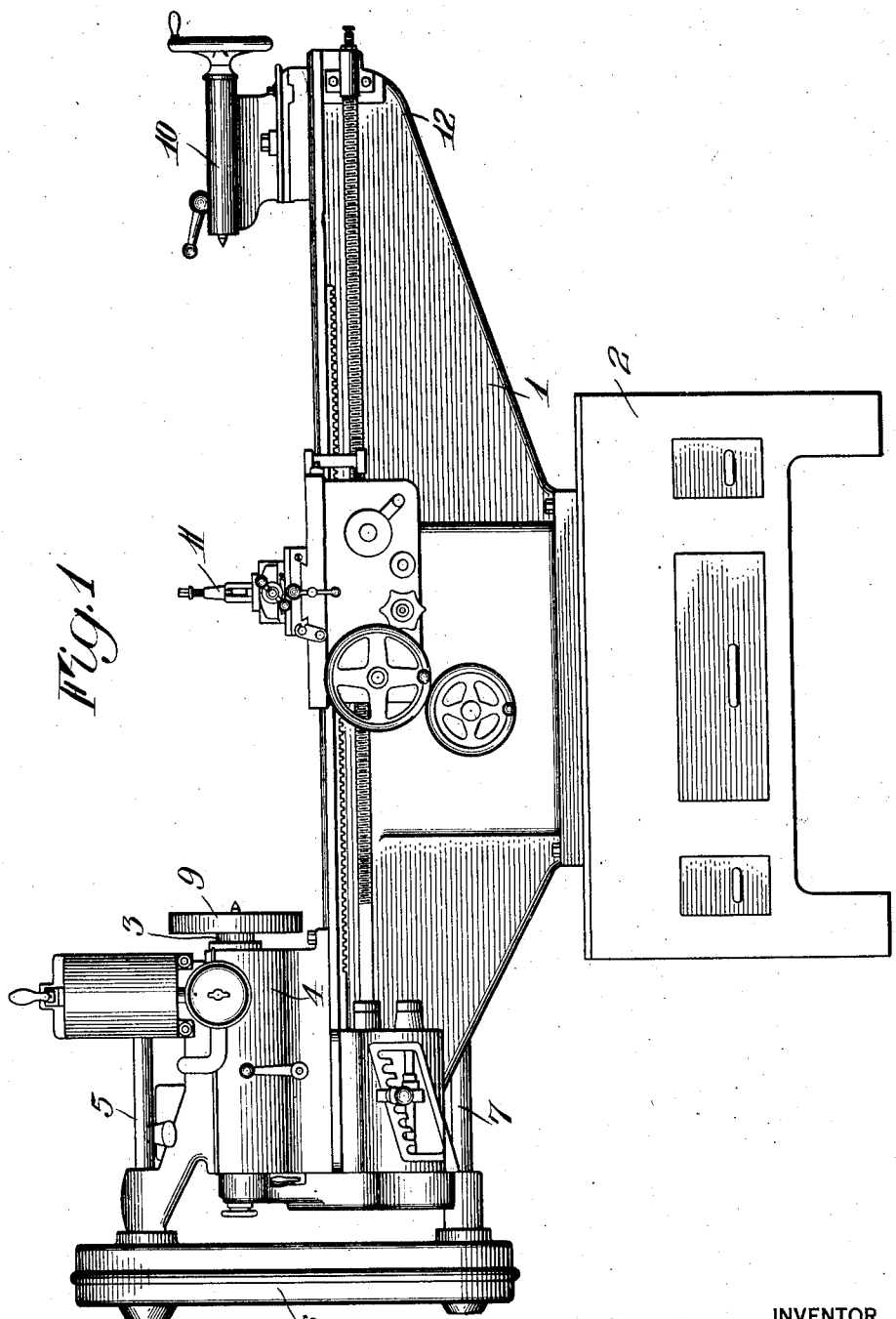

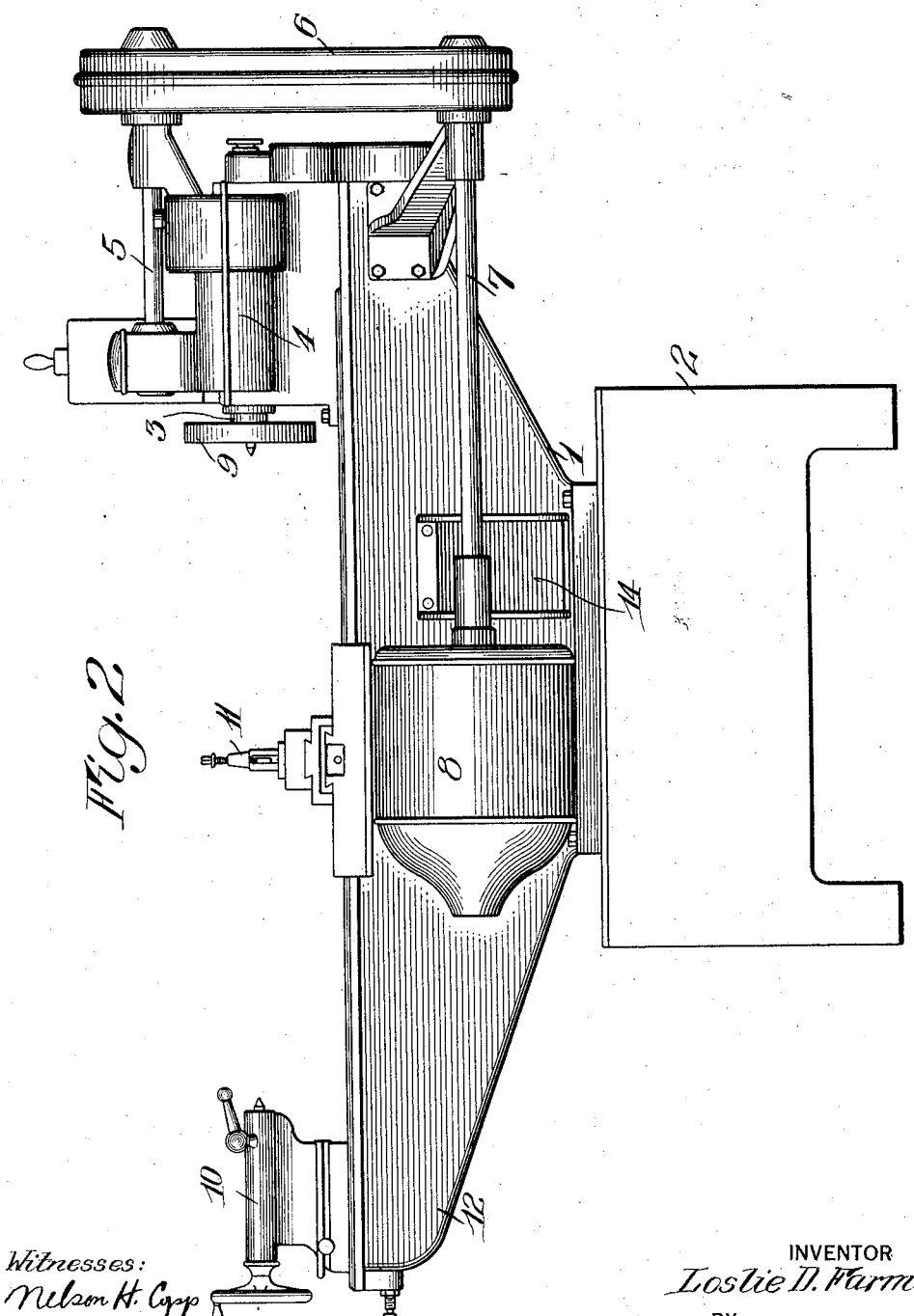

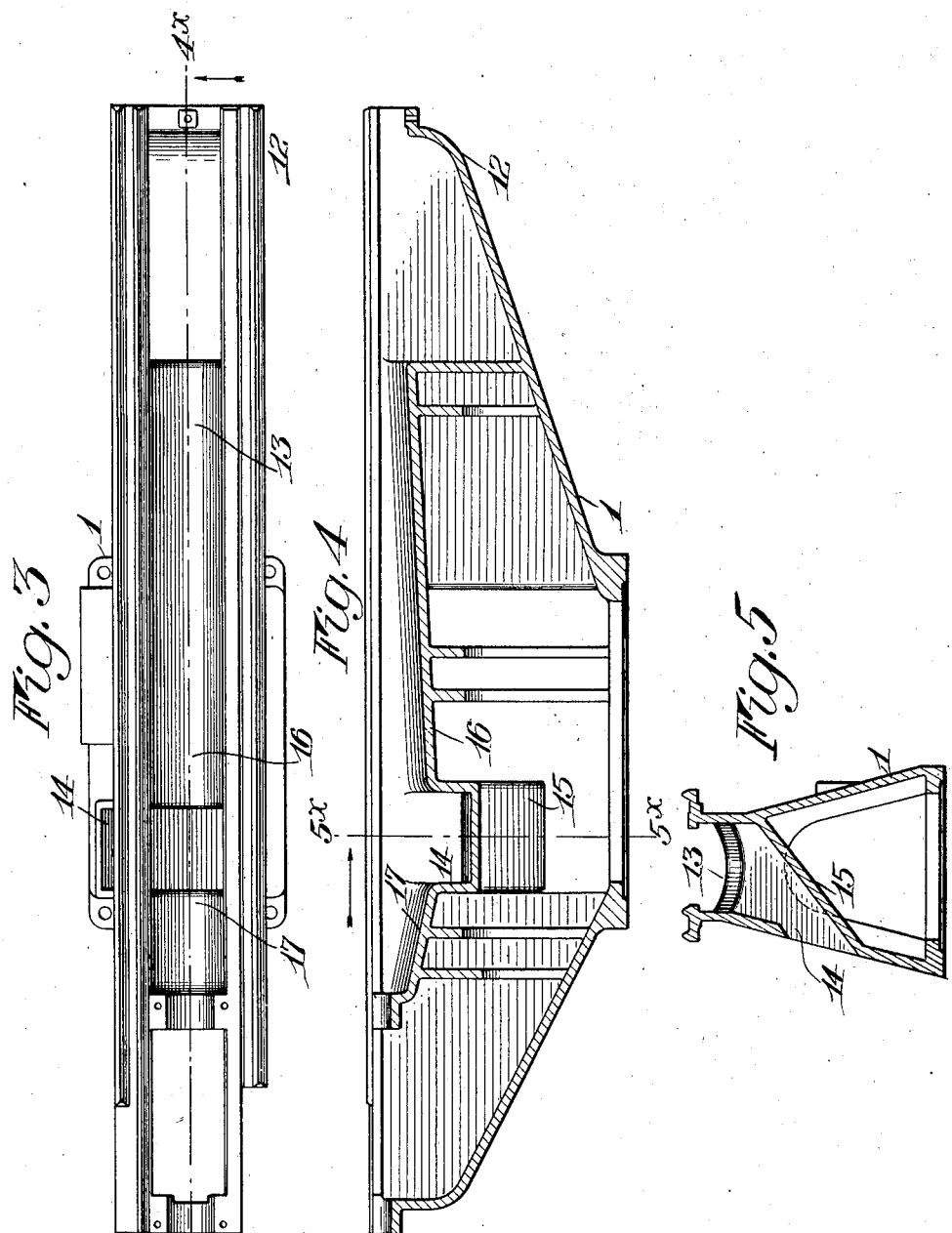

LESLIE D. FARMER, OF ROCHESTER, NEW YORK, ASSIGNOR TO DAVIS MACHINE TOOL COMPANY, INC., OF ROCHESTER, NEW YORK, A CORPORATION OF NEW YORK.

LATHE.

1,332,978. Specification of Letters Patent. Patented Mar. 9, 1920.

Application filed August 31, 1918. Serial No. 252,204.

*To all whom it may concern:*

Be it known that I, LESLIE D. FARMER, a citizen of the United States, residing at Rochester, in the county of Monroe and State of New York, have invented certain new and useful Improvements in Lathes; and I do hereby declare the following to be a full, clear, and exact description of the same, reference being had to the accompanying drawings, forming a part of this specification, and to the reference-numerals marked thereon.

My invention relates to lathes of the kind which are mounted on a truck for portability and used in the field or other convenient places. The object of my invention is to provide an improved trough and chute in the bed of the lathe to receive the chips and other refuse from the work, and from which it can be easily removed. A further object of my invention is to provide a portable lathe which is light, and in which the parts are so arranged as to secure the greatest amount of stability. To these and other ends the invention consists in certain improvements and combinations of parts, all as will be hereinafter more fully described, the novel features being pointed out in the claims at the end of the specification.

In the drawings:

Figure 1 is a front elevation of a lathe involving the principles of my invention, Fig. 2 is a rear elevation of the same, Fig. 3 is a plan view of the base of the machine, Fig. 4 is a longitudinal section taken on the line 4×—4× of Fig. 3, and Fig. 5 is a transverse section on the line 5×—5× of Fig. 4.

Similar reference numerals in the several figures indicate the same parts.

The frame 1 of the machine may be supported on a pedestal or base 2, which may be secured in a truck or other vehicle. A spindle or shaft 3 is rotatably mounted in bearings 4 supported on the bed of frame 1. The spindle 3 is operatively connected with a counter-shaft 5 rotatably supported in brackets extending upwardly from the bearing member 4. The counter-shaft 5 is driven by means of a belt or noiseless chain inclosed in a casing 6 and connected with the shaft 7 driven by the motor 8. The work is supported between a face plate 9 mounted on the spindle 3 and a tail stock 10 adjustably mounted on longitudinally extending guide rails on the bed of the machine. Adjustably mounted on the bed, in position to coöperate with the work, is a tool holding member 11, which may be adjusted both longitudinally and transversely of the machine by the usual means.

The frame of the machine is supported centrally of the base 2, and the right-hand end 12 is extended farther from the middle of the base than the opposite end and serves to counterbalance the latter, which carries the operating means or driving mechanism of the machine. The motor 8 is mounted in rear of the machine over the base, but slightly to the right of the middle of the same, and by this mounting also serves to counterbalance the parts. By this arrangement of the parts, the center of gravity of the machine is brought to a position immediately over the middle of the base and lends stability to the machine while being rapidly transported from one place to another on a truck. As indicated in the sectional views, the frame of the machine is made of relatively thin walls and partly cut away to reduce weight and render the machine more readily portable.

The bed is provided with an opening between the guide rails for the tool holding member, and an integral wall on the frame extends across the opening below the latter, having a downward inclination transversely of the guide rails to form a chip collecting trough 13, into which the chips and other particles cut from the work piece fall. The trough 13 intermediate its ends communicates with a chute 14, the bottom wall 15 of which inclines rearwardly and downwardly and discharges to the back side of the machine. The bottom walls 16 and 17 of the trough incline downwardly and inwardly to the chute. By this arrangement, the trough can be readily flushed out and the chips and other material collected therein washed out through the chute.

Having described my invention, what I claim and desire to secure by Letters Patent is:

1. In a lathe, the combination of a bed, work holding devices supported thereon, a tool holding member movable thereon, and a chip trough and discharge chute formed integrally with the bed in the top thereof, the bottom walls of said trough inclining downwardly toward the chute and the bottom wall of the chute being inclined downwardly to the rear side of the lathe.

2. In a lathe frame, a bed provided with spaced guideways and a portion between said guideways inclined downwardly transversely of the latter to form a chip trough and a chip chute formed integrally with said frame and inclined downwardly transversely of said guideways to discharge at the rear of the frame, said chip trough having also an inclination longitudinally of said guideways and discharging into said chute.

3. In a lathe frame, a bed provided with spaced guideways extending longitudinally thereof and also a portion between said guideways inclined downwardly transversely of the bed to form a longitudinally extending chip trough, and a chip chute intermediate the ends of said chip trough and inclined downwardly transversely of the bed to discharge at the rear thereof, said chip trough having also an inclination from each of its ends downwardly toward said chute to discharge into the latter.

4. A lathe frame, comprising a bed provided with spaced guideways and with an opening therein between said guideways, an integral wall extending across the frame below said opening and inclined downwardly transversely of said guideways to form a chip collecting trough, and integral walls on the frame forming a chip discharge chute inclined downwardly transversely of the guideways toward the rear of the frame, said chip trough having also a downward inclination toward and discharging into said chute.

5. A portable lathe frame comprising a bed, work and tool holding devices on said bed, operating mechanism for said devices located on the frame adjacent one end of the bed, means for detachably supporting the frame on a pedestal located between the center of the frame and said mechanism, and a motor on the frame connected with said mechanism and located on the side of said supporting means opposite said mechanism.

6. In a portable lathe, a bed, a frame having lightly constructed walls for detachably supporting said bed on a pedestal, work and tool holding devices on said bed, operating mechanism for said devices located on the frame adjacent one end of the bed, means for detachably supporting the frame on a pedestal located between the center of the frame and said mechanism, and a motor on the frame connected with said mechanism and located on the side of said supporting means opposite said mechanism, said parts being arranged to bring the center of gravity of the frame at the center of said supporting means to balance the lathe.

LESLIE D. FARMER.